Jan. 2, 1934.  G. ZAPF  1,942,321
SUBMARINE CABLE
Filed March 25, 1931
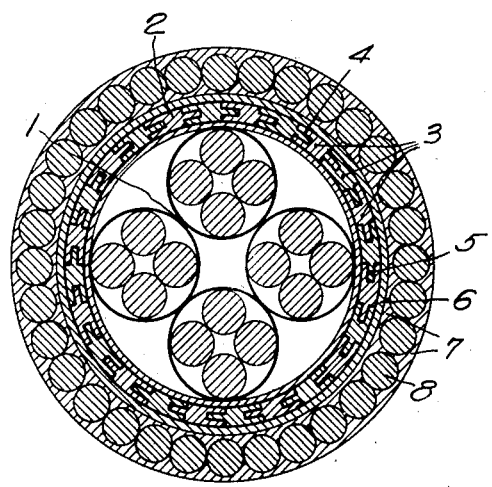
G. Zapf INVENTOR

UNITED STATES PATENT OFFICE 1,942,321

SUBMARINE CABLE

Georg Zapf, Cologne, Germany, assignor to Felten & Guilleaume Carlswerk Actien-Gesellschaft, Cologne-Mulheim, Germany Application March 25, 1931, Serial No. 525,298, and in Germany March 21, 1930

1 Claim. (Cl. 173—266)

It has hitherto been proposed to render submarine cables, more particularly those intended for great depths, resistant against water pressure by providing a pressure-protecting casing over the cable core underneath the cable sheathing. It has further been proposed to make such pressure-protecting casings not of interlocked wires but to construct them in such a way that wires of circular cross-section should alternate with profile wires which are semi-circularly hollowed on both sides.

The invention relates to a pressure-protecting tube constituted by stranded profile wires which are fitted into one another so that they cannot be unlocked, the tube thus forming not only a sufficient protection for the cable with respect to the radially- and inwardly-directed pressure of the water but also prevents the tube from being damaged by any radially- and outwardly-directed forces which may arise during the manufacture and laying of the cable.

This is attained according to the invention by constructing the pressure-protecting covering of profile wires which engage within one another by means of keys and grooves.

The accompanying drawing illustrates a cable according to the invention, in which a pressure-protecting tube such as above referred to is embodied. The pressure-protecting tube 2 surrounds the cable cores 1, being constituted by profile wires 3. These profile wires engage with one another by means of keys 4 and grooves 5, so that they are firmly interlocked with one another. By drawing the inter-engaging and stranded wires through rollers or dies, they are so interlocked with one another that they cannot be severed. The lead sheathing 6 is supported by the pressure tube, being protected in the usual manner by the layer of jute 7 and armouring 8. By using the key and groove connection hereinbefore referred to the advantage is secured as compared with pressure-protecting tubes with the usual profile forms as hitherto employed that the thickness of the wall of the tube is substantially reduced, whereby a great reduction in weight is secured.

What I claim is:—

A deep sea submarine cable comprising cable cores and a pressure protecting casing made up of profile wires which are stranded together around the cable cores, the wires being formed with tongues and grooves for interengagement with each other and pressed into interlocking relation with each other, a lead sheathing surrounding said wires and a protecting covering of jute and armouring around said sheathing.

GEORG ZAPF.